United States Patent [19]
Sweet et al.

[11] Patent Number: 5,804,019
[45] Date of Patent: Sep. 8, 1998

[54] APPARATUS AND METHOD FOR APPLYING ADHESIVE AND RELEASE PAPER TO WOODEN FLOORING STRIPS

[75] Inventors: James C. Sweet, Troutman; Ernest E. Cline, Monroe; Alan E. Cline, Marshville, all of N.C.

[73] Assignee: Triangle Pacific Corporation, Dallas, Tex.

[21] Appl. No.: 792,520

[22] Filed: Jan. 31, 1997

[51] Int. Cl.⁶ .......................... B32B 31/10; B32B 31/12; B32B 35/00

[52] U.S. Cl. .......................... 156/250; 156/64; 156/252; 156/289; 156/353; 156/356; 156/362; 156/510; 156/522; 156/578

[58] Field of Search .................................. 156/252, 289, 156/300, 302, 270, 510, 522, 552, 578, 567, 571, 250, 64, 356, 353, 355, 362

[56] References Cited

U.S. PATENT DOCUMENTS

| | | | |
|---|---|---|---|
| 338,973 | 3/1886 | Johnson, Jr. | 144/37 |
| 362,896 | 5/1887 | Mahaffey | 144/37 |
| 418,345 | 12/1889 | Woods et al. | 144/37 |
| 932,373 | 8/1909 | Burns et al. | 144/39 |
| 955,379 | 4/1910 | Burns et al. | 144/39 |
| 987,012 | 3/1911 | Perkins | 144/37 |
| 1,394,120 | 10/1921 | Rockwell | 144/350 |
| 1,456,864 | 5/1923 | Blood et al. | 144/90 R |
| 1,584,796 | 5/1926 | Neal . | |
| 1,778,333 | 10/1930 | Neumann | 52/730.7 |
| 1,801,244 | 4/1931 | Blood | 144/90 R |
| 2,139,880 | 12/1938 | Colucci | 20/91 |
| 2,491,498 | 12/1949 | Kähr | 20/75 |
| 2,725,910 | 12/1955 | Kähr | 144/309 |
| 2,900,676 | 8/1959 | Kähr | 20/7 |
| 3,016,316 | 1/1962 | Olson | 154/45.9 |
| 3,287,203 | 11/1966 | Elmendorf . | |

(List continued on next page.)

FOREIGN PATENT DOCUMENTS

| | | |
|---|---|---|
| 1198883 | 8/1984 | Argentina . |
| 1201246 | 3/1985 | Argentina . |
| 3700799A1 | 7/1988 | Germany . |
| 154091 | 7/1932 | Switzerland . |
| 328341 | 4/1958 | Switzerland . |
| WO89/01857 | 3/1989 | WIPO . |

OTHER PUBLICATIONS

Wood & Wood Products, "Wood Tile Firm Improves Product with New Adhesive System," All Pages, Oct. 1988.

Bruce Hardwood Floors, "How To Install," All Pages, 1992.

Premier Wood Floors and The Wood Wizard Present, "Wood Magic," pp. 11–15, 35–40, 47–48, 58–63, and 80–85; Jan. 15, 1995.

Bruce Hardwood Floors, "Installers Handbook," pp. 6, 7, 56–58, and 62; 1994.

*Primary Examiner*—Curtis Mayes
*Attorney, Agent, or Firm*—Adams Law Firm, P.A.

[57] ABSTRACT

An apparatus for applying adhesive and a protective release paper to successive elongate wooden flooring strips having a top decorative side, and a bottom adhesive side for being adhered to a supporting subfloor. The apparatus includes an infeed conveyor for receiving successive wooden flooring strips top side-up from an upstream processing station in parallel lengthwise alignment to each other and moving the flooring strips in a direction of movement perpendicular to the length of the flooring strips. An accumulator equally spaces the flooring strips apart on the infeed conveyor. An inverter receives successive flooring strips from the infeed conveyor and inverts the flooring strips from top decorative side-up to bottom adhesive side-up. An applicator conveyor receives the inverted flooring strips from the inverter and moves the flooring strips end-to-end in a direction of movement parallel to the length of the flooring strips. An adhesive applicator is positioned above the applicator conveyor for applying adhesive to the bottom adhesive side of the flooring strips as they move beneath the adhesive application means. Release paper is perforated to match the joint between strips and is applied to the adhesive on the flooring strip. The perforation is thereafter broken and the flooring strips are ready for inspection and packaging.

15 Claims, 17 Drawing Sheets

U.S. PATENT DOCUMENTS

| | | | |
|---|---|---|---|
| 3,345,244 | 10/1967 | Stolesen et al. | 161/116 |
| 3,579,941 | 5/1971 | Tibbals | 52/384 |
| 3,583,889 | 6/1971 | Califano et al. . | |
| 3,615,975 | 10/1971 | Gillern et al. | 156/79 |
| 3,627,861 | 12/1971 | Timke | 422/49 |
| 3,738,404 | 6/1973 | Walker | 144/312 |
| 3,817,012 | 6/1974 | Wack et al. | 52/315 |
| 3,847,647 | 11/1974 | Bahlo | 117/38 |
| 3,888,061 | 6/1975 | Kähr | 52/589 |
| 3,934,630 | 1/1976 | Cockle | 144/39 |
| 4,041,200 | 8/1977 | Boranian et al. | 428/40 |
| 4,123,305 | 10/1978 | Krzeszowski | 156/71 |
| 4,165,409 | 8/1979 | Maine . | |
| 4,259,470 | 3/1981 | Trotter et al. | 526/348 |
| 4,388,788 | 6/1983 | Bosco | 52/390 |
| 4,471,012 | 9/1984 | Maxwell . | |
| 4,695,502 | 9/1987 | Rush . | |
| 4,731,140 | 3/1988 | Yontrarak . | |
| 4,784,887 | 11/1988 | Abendroth | 428/54 |
| 4,789,604 | 12/1988 | van der Hoeven | 428/503 |
| 4,879,857 | 11/1989 | Peterson et al. | 52/403 |
| 4,893,449 | 1/1990 | Kemper | 52/467 |
| 4,906,497 | 3/1990 | Hellmann et al. . | |
| 5,109,898 | 5/1992 | Schacht | 144/350 |
| 5,110,889 | 5/1992 | Higbie et al. . | |
| 5,283,102 | 2/1994 | Sweet et al. | 428/167 |
| 5,352,317 | 10/1994 | Traben et al. | 144/3 R |

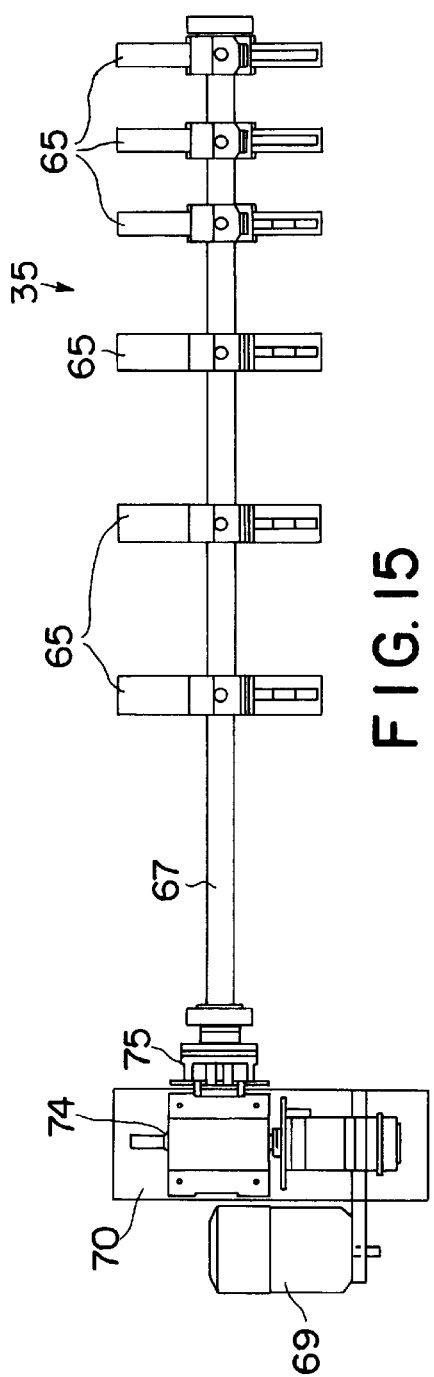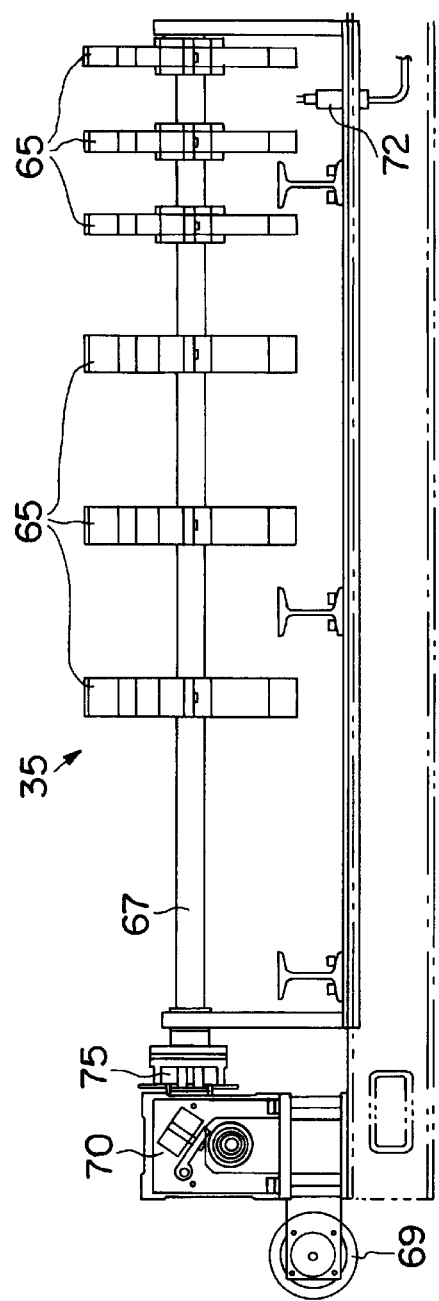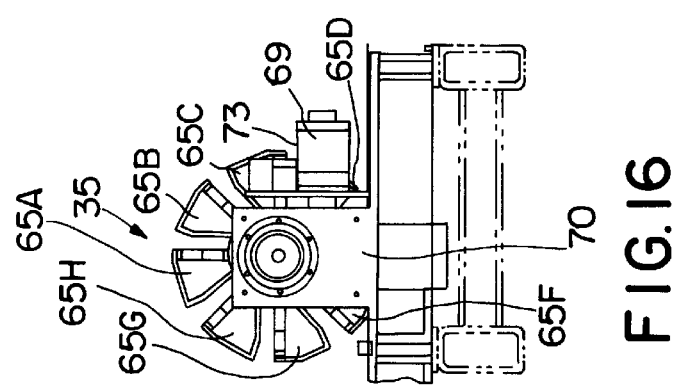
FIG. 15
FIG. 14
FIG. 16

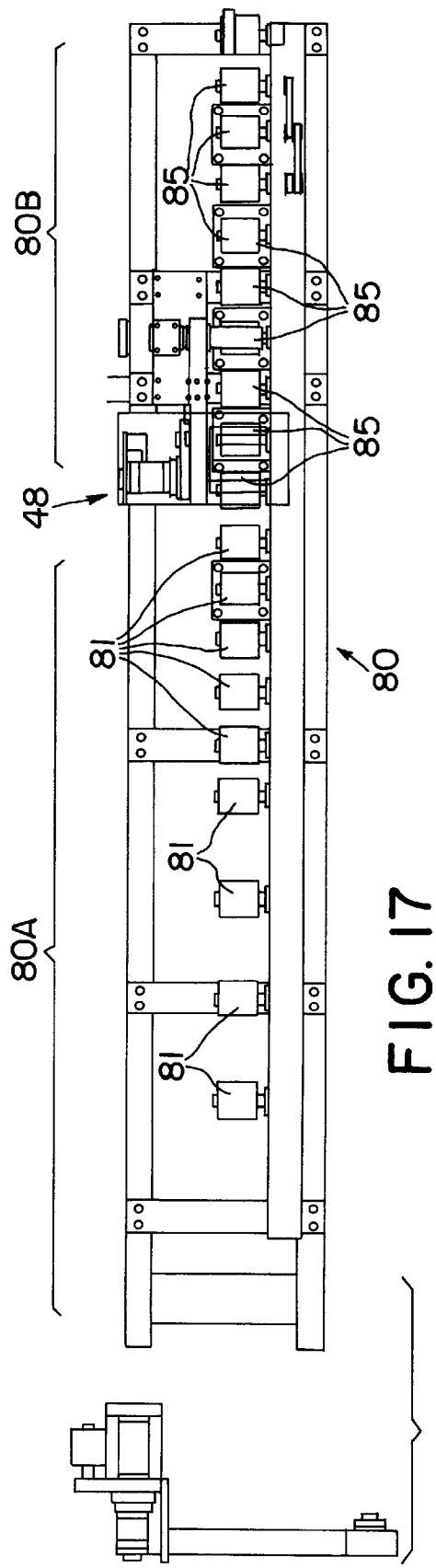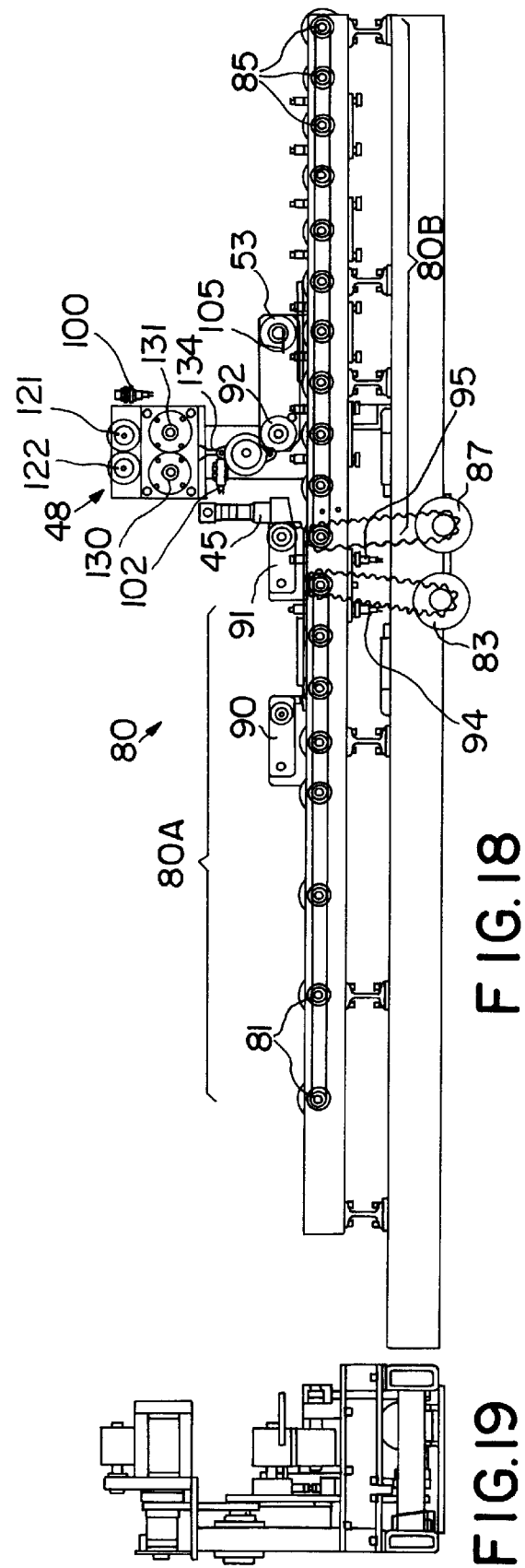

APPARATUS AND METHOD FOR APPLYING ADHESIVE AND RELEASE PAPER TO WOODEN FLOORING STRIPS

TECHNICAL FIELD AND BACKGROUND OF THE INVENTION

This invention relates to an apparatus and method for applying adhesive and release paper to hardwood flooring strips, a laminated wood flooring product, and a wood floor assembled from strips of the laminated wood flooring product. The flooring product which is the subject of this invention relates generally to products which are intended to simulate far more expensive solid wood flooring fabricated from woods such as oak, maple or ash. The laminated flooring has a decorative top layer which is a relatively thin veneer layer of oak, maple, ash or some other wood, and is the exposed, decorative wear surface of the floor when the floor is laid. The floor, when properly installed, appears to be a solid wood floor, but is far less expensive. The laminated flooring products use less slowgrowing hardwoods in favor of cheaper, faster-growing softwoods such as lauan, poplar or the like for the non-exposed laminations. As used in this application, the term "flooring strip" includes elongate flooring products of various widths, which may be referred to as, for example, "strips" or "planks" in the art. The flooring product disclosed in this application is intended to be suitable for "do-it-yourself" projects where installation is carried out by the homeowner. However, the product is also suitable for professional installation.

Laminated wood floors are known in the art, and are subject to a number of problems. For example, some laminated wood floors are specified as only being suitable for installation over certain types of subfloors. In other instances, subfloors must be removed because of poor condition, or because of irregularities in the surface which prevent proper installation. This is a particular problem since many older flooring materials contain asbestos. Prior art laminated wood floors are often subject to warping, twisting and cupping, thereby requiring replacement or sanding to refurbish. In addition, a laminated wood floor which does not adhere to the subfloor at all points will create a hollow sound, and flex slightly when walked on, clearly indicating that the floor is not a solid floor. Prior art laminated wood flooring strips are relatively stiff, thereby requiring a strong adhesive such as a chlorinated solvent adhesive, to bond the floor to the subfloor. This is particularly true of subfloors which may have irregularities in the surface. Even with a very strong adhesive, bowing, sideways sliding and similar problems are common. Applicant's prior patent No. 5,283,102 represents a solution to several persistent problems experienced with laminated flooring products.

The chlorinated solvent adhesive used to bond the prior art laminated wood flooring to the concrete must be very rubbery, because despite the lamination, the flooring moves slightly during the years of wear. This rubbery adhesive is typically sold in large buckets in the form of a mastic. Furthermore, methyl chloroform is typically a principal ingredient in chlorinated solvent adhesives. Vapors emitted from this chemical are not only an environmental threat, but are also potentially damaging to household appliances, such as hot water heaters and furnaces. Even with such a very strong adhesive, bowing, sideways sliding and similar problems are common.

Application of the mastic adhesive layer requires skill, as does as placement of the flooring strips onto the mastic layer. Unless performed quickly by skilled workmen, the mastic can begin to cure before the flooring strips are applied. Application of the mastic the is also relatively messy, and may result in much wasted or leftover material.

Another known flooring product has a foam adhesive backing which has been found to delaminate and cause failure of the flooring system. This type of floor has not met with long-term success because of this problem and also because the foam provides a soft feel to the floor distinct from the feel of a solid wood floor and which thus indicates that the floor is not solid.

The invention according to this application takes advantage of the enhanced flexibility of the laminated flooring product to utilize a novel adhesive system as applied to to wood flooring products. In general, a hot melt adhesive is applied to the bottom side of the flooring strip and then covered with a release paper. The apparatus and method according to the invention permits high production rates together with highly accurate placement of the adhesive and the release paper.

SUMMARY OF THE INVENTION

Therefore, it is an object of the invention to provide an apparatus which permits automated application of adhesive to wood flooring strips.

It is another object of the invention to provide an apparatus which permits automated application of adhesive to random length wood flooring strips.

It is another object of the invention to provide an apparatus which permits application of adhesive and release paper to random lengths of wood flooring strips at high production rates.

It is another object of the invention to provide an apparatus which permits application of hot melt adhesive and release paper to random lengths of wood flooring strips at high production rates.

It is another object of the invention to provide an apparatus which permits application of hot melt adhesive and release paper to random lengths of wood flooring strips being fed at random intervals.

It is another object of the invention to provide an apparatus which indexes and inverts random lengths of wood flooring strips received from an upstream processing station in preparation for application of adhesive and a protective release paper.

It is another object of the invention to provide a method which achieves the objects set out above.

These and other objects of the present invention are achieved in the preferred embodiments disclosed below by providing an apparatus for applying adhesive and a protective release paper to successive elongate wooden flooring strips having a top decorative side, and a bottom adhesive side for being adhered to a supporting subfloor. The apparatus comprises infeed conveyor means for receiving successive wooden flooring strips top side-up from an upstream processing station in parallel lengthwise alignment to each other and moving the flooring strips in a direction of movement perpendicular to the length of the flooring strips. Accumulating means are provided for equally spacing the flooring strips apart on the infeed conveyor. An inverting means receives successive flooring strips from the infeed conveyor and successively inverts the flooring strips from top decorative side-up to bottom adhesive side-up. An applicator conveyor means receives the inverted flooring strips from the inverting means and moves the flooring strips end-to-end in a direction of movement parallel to the length of the flooring strips. Adhesive application means are positioned above the applicator conveyor means for applying adhesive to the bottom adhesive side of the flooring strips as they move beneath the adhesive application means. Release paper means are positioned above and downstream from the adhesive application means for applying a release paper to the adhesive on the flooring strip.

According to one preferred embodiment of the invention, the accumulating means comprises infeed conveyor sensing means for sensing the presence of a flooring strip on the infeed conveyor at a position closer than a predetermined minimum distance to a preceding adjacent flooring strip, and holding means responsive to the infeed conveyor sensing means for holding the flooring strip against movement on the infeed conveyor for an interval determined by the rate at which the inverting means receives the next successive flooring strip, and for releasing the flooring strip for movement to the inverting means when the sensing means indicates that the predetermined minimum distance between adjacent flooring ships exists.

According to another preferred embodiment of the invention, the inverting means comprises an indexing wheel mounted for rotation between the infeed conveyor means and the applicator conveyor means. The inverting wheel comprises an axle mounted for indexed rotation about an axis perpendicular to the direction of movement of the infeed conveyor and parallel to the direction of movement of the applicator conveyor. Drive means are connected to the axle for indexing the inverting wheel through predetermined successive arcs. A plurality of spaced-apart diverging blades are carried by and extend radially outwardly from the axle, each of the blades having a flooring strip receiving surface for receiving successive flooring strips from the infeed conveyor means and inverting the flooring strip for placement of the inverted flooring strip onto the applicator conveyor.

According to yet another preferred embodiment of the invention, the applicator conveyor includes an upstream accelerator conveyor segment onto which the inverted flooring strips are received from the inverting means. The accelerator conveyor segment accelerates the wood flooring strip thereon downstream into end-to-end abutting contact with a preceding flooring strip. A downstream outfeed conveyor delivers processed flooring strips from the apparatus.

According to yet another preferred embodiment of the invention, the accelerator conveyor segment is driven by a two speed motor having a high speed for accelerating the flooring strip into end-to-end abutting contact with a preceding flooring strip during operation of the inverting means, and a low speed for moving the flooring strip at the same speed as the outfeed conveyor.

According to yet another preferred embodiment of the invention, applicator sensing means are provided for stopping and starting application of adhesive and release paper to the flooring strips.

According to yet another preferred embodiment of the invention, the release paper means includes a paper roll for delivering a continuous length of release paper, flooring strip end sensing means for detecting a forward end of the flooring strips, and perforation means for perforating the release paper between flooring strips before application of the release paper to the flooring strips.

Preferably, the apparatus includes perforation breaking means for breaking the perforation.

An embodiment of the method for applying adhesive and a protective release paper to successive elongate wooden flooring strips having a top decorative side, and a bottom adhesive side for being adhered to a supporting subfloor according to the invention comprises the steps of receiving successive wooden flooring strips top side-up from an upstream processing station in parallel lengthwise alignment to each other, moving the flooring strips on an infeed conveyor in a direction of movement perpendicular to the length of the flooring strips, spacing the flooring strips apart on the infeed conveyor, inverting the flooring strips from top decorative side-up to bottom adhesive side-up, receiving the inverted flooring strips and moving the flooring strips end-to-end in a direction of movement parallel to the length of the flooring strips, applying adhesive to the bottom adhesive side of the flooring strips as they move beneath the adhesive application means, and applying release paper to the adhesive on the flooring strip.

According to one preferred embodiment of the invention, the step of spacing the flooring strips comprises sensing the presence of a flooring strip on the infeed conveyor at a position closer than a predetermined minimum distance to a preceding adjacent flooring strip, and holding the flooring strip against movement on the infeed conveyor for an interval determined by the rate at which the inverting means receives the next successive flooring strip, and for releasing the flooring strip for movement to the inverting means when the sensing means indicates that the predetermined minimum distance between adjacent flooring strips exists.

According to another preferred embodiment of the invention, the step of the inverting the flooring strips comprises delivering the flooring strips consecutively onto an indexing wheel mounted for rotation between the infeed conveyor means and the applicator conveyor means, and rotating the indexing wheel about an axis perpendicular to the direction of movement of the infeed conveyor and parallel to the direction of movement of the applicator conveyor to position the bottom adhesive side in an upwardly-facing position.

According to yet another preferred embodiment of the invention, the step of moving the flooring strips end-to-end comprises the step of accelerating a wood flooring strip downstream into end-to-end abutting contact with a preceding flooring strip.

According to yet another preferred embodiment of the invention, the step of applying adhesive to the bottom adhesive side of the flooring strips includes the step of sensing the ends of the flooring strips and interrupting application of adhesive in an area adjacent the ends of the flooring strip.

According to yet another preferred embodiment of the invention, the step of applying release paper to the adhesive comprises the steps of delivering a continuous length of release paper to a flooring strip onto which has just been applied the adhesive, sensing a forward end of the flooring strip, and perforating the release paper between adjacent flooring strips before application of the release paper to the flooring strips.

According to yet another preferred embodiment of the invention, the method includes the step of breaking the perforation.

BRIEF DESCRIPTION OF THE DRAWINGS

Some of the objects of the invention have been set forth above. Other objects and advantages of the invention will appear as the invention proceeds when taken in conjunction with the following figures, in which:

FIG. 14 is a front elevation of the indexing wheel for inverting the flooring strips from the top decorative side-up to the bottom adhesive side-up;

FIG. 15 is a top plan view of the indexing wheel shown in FIG. 11;

FIG. 16 is a side elevation of the indexing wheel shown in FIG. 11;

FIG. 17 is a top plan view of the applicator conveyor;

FIG. 18 is an front elevation of the applicator conveyor;

FIG. 19 is a end elevation of the applicator conveyor;

DESCRIPTION OF THE PREFERRED EMBODIMENT AND BEST MODE

General Description of Flooring Strip

Figure 1:
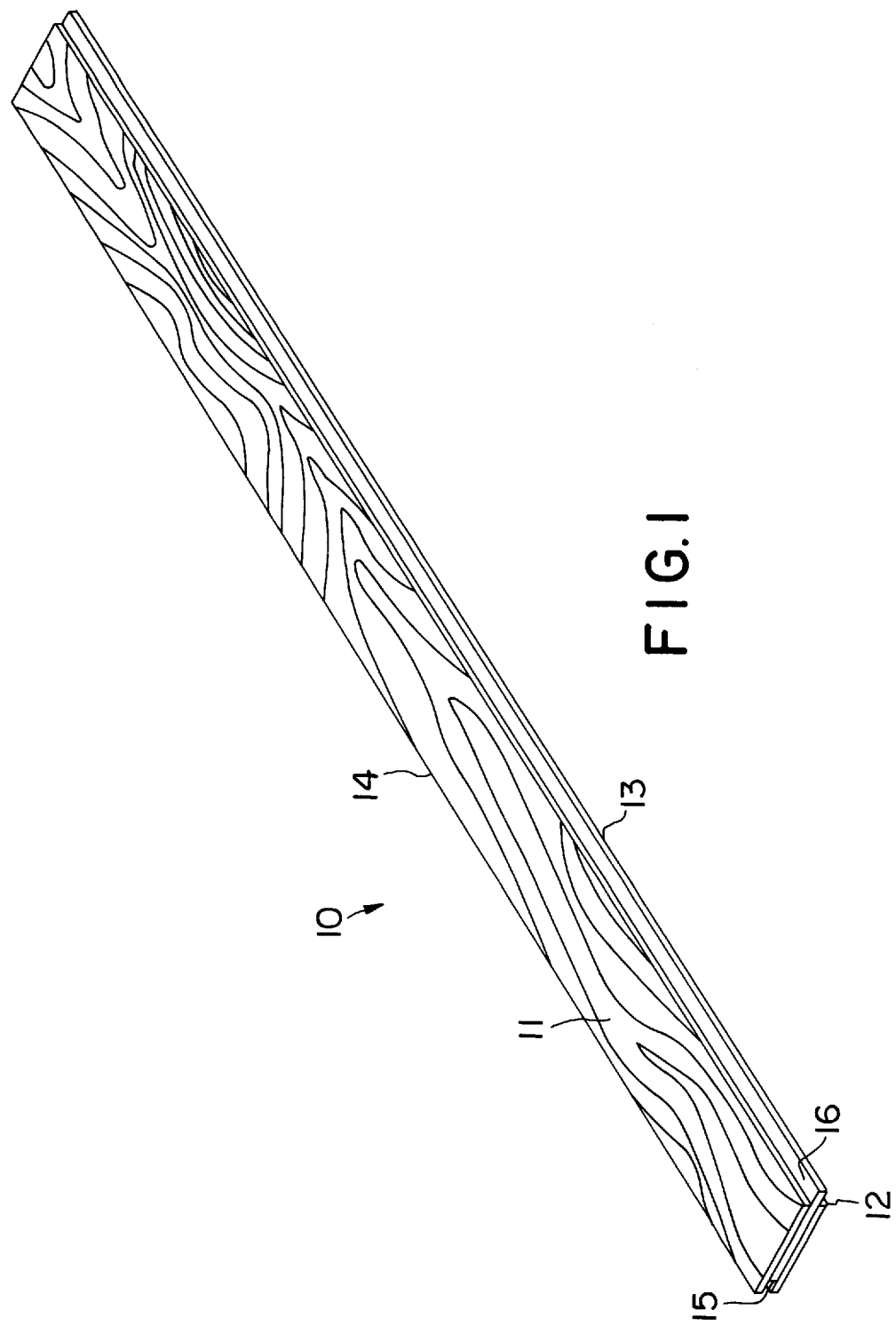
FIG. 1 is a perspective view of the finished side of a flooring strip according to a preferred embodiment of the present invention.

Referring now specifically to the drawings, a wooden flooring strip according to the present invention is illustrated in FIG. 1 and shown generally at reference numeral 10. Flooring strip 10 may be any suitable length, width and thickness, but typical sizes and constructions are ¼th, ⅜ths and ¹⁵⁄₁₆ths-inch thick laminated or solid oak flooring strips between 2 and ¼ inches and 8 inches wide and up to 5 feet long, or as parquet blocks.

Flooring strip 10 has a top decorative surface 11 which may be sold finished or unfinished for finishing after installation. Flooring strip 10 has an opposite bottom surface 12, and opposed side edges 13 and 14. The flooring strip 10 includes a groove 15 which extends along side edge 14 and a mating tongue 16 which extends along the opposite side edge 13. Grooves 15 and tongues 16 of adjacent like flooring strips 10 mate to form a substantially seamless floor.

Figure 2:
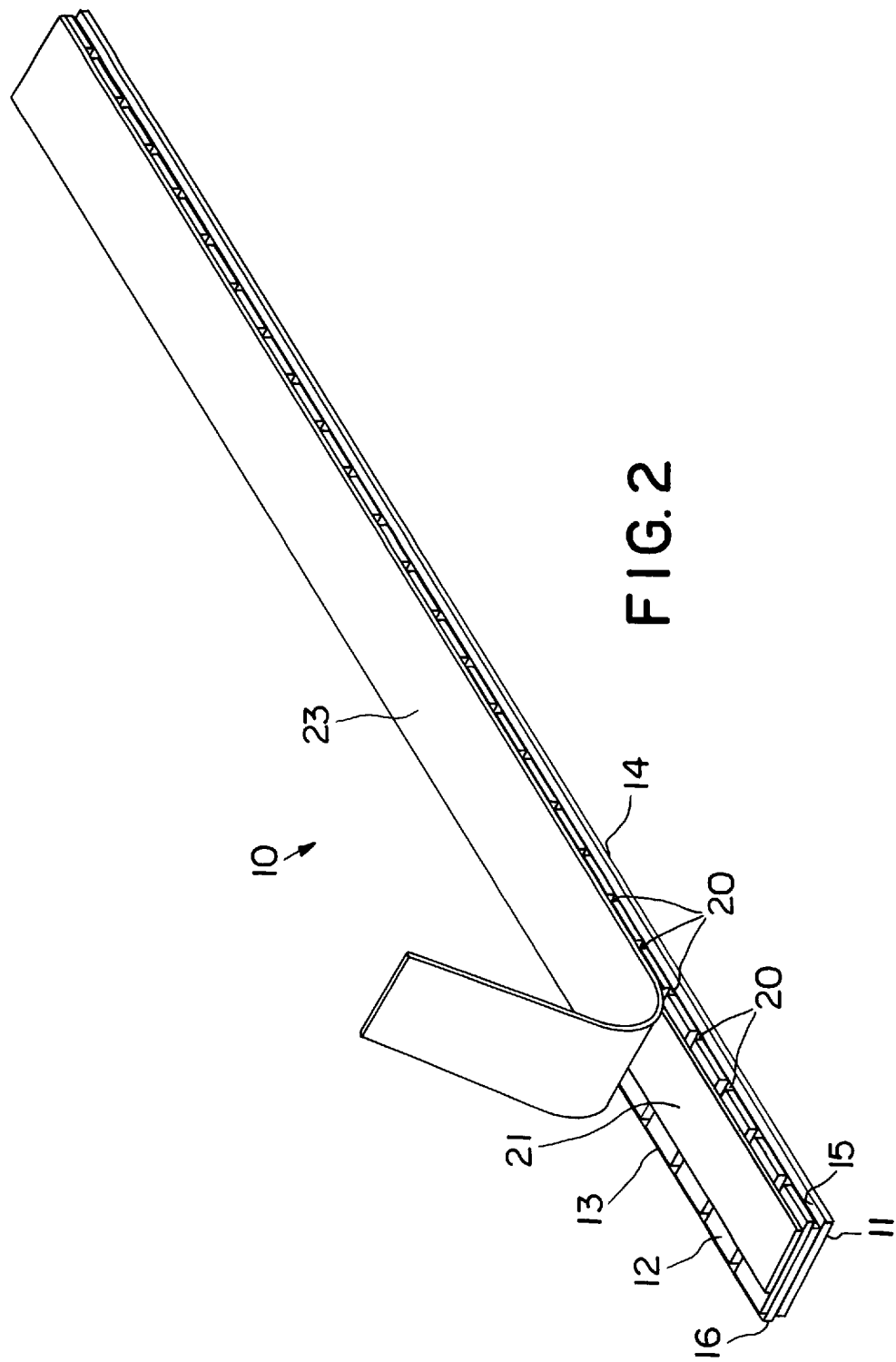
FIG. 2 is a perspective view of the unfinished, adhesive-coated side of the flooring strip shown in FIG. 1, with the adhesive covered with a release paper.
Figure 3:
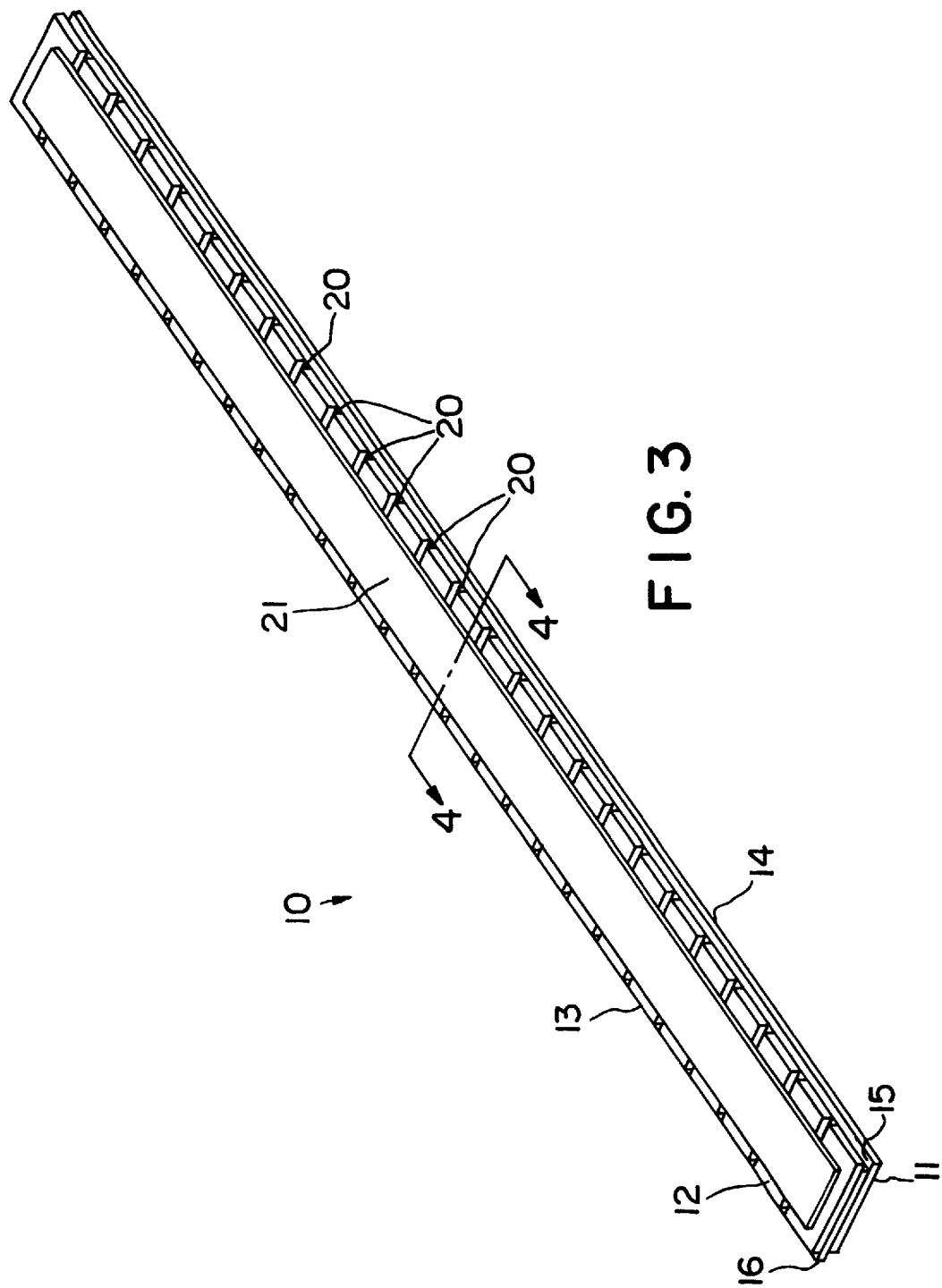
FIG. 3 is a perspective view of the unfinished, adhesive-coated side of the flooring strip shown in FIG. 1, with the release paper removed and the adhesive exposed for application.

As is shown in FIGS. 2 and 3, the bottom surface 12 is preferably provided with transverse scores 20. The scores 20 extend from side-to-side in closely spaced-apart relation transverse to the length of the flooring strip 10 along substantially the entire length of the of the flooring strip 10, substantially as disclosed in applicant's U.S. Pat. No. 5,283,102. In accordance with a preferred embodiment of the invention, the scores 20 are ⅛th inch wide, ⅛th inch deep, and are spaced apart one inch on center. Other widths, depths and spacings are also possible.

The bottom surface 12 of flooring strip 10 is coated with a hot melt adhesive 21. Preferably, the adhesive 21 is applied in a single lengthwise-extending length from one end of the flooring strip 10 to the other, but may also be applied in two or more spaced-part ribbons.

The adhesive 21 is preferably spaced from both side edges 13 and 14 of the flooring strip 10, leaving bare wood exposed adjacent both side edges 13 and 14.

Figure 4:
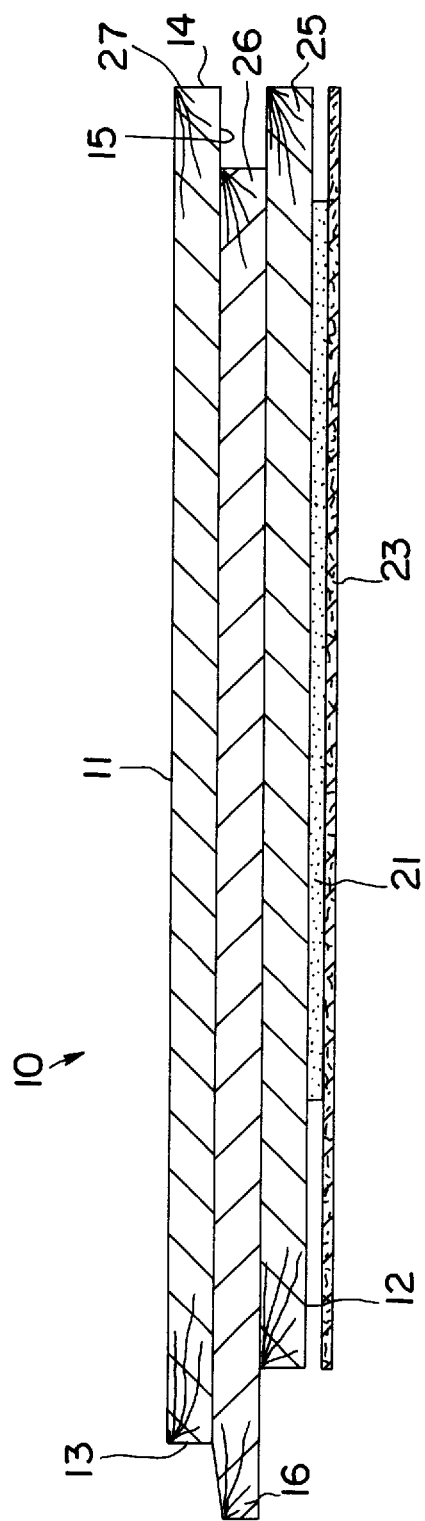
FIG. 4 is an enlarged cross-section taken along lines 4—4 of FIG. 3.

As is shown in FIG. 4, the flooring strip 10 according to one preferred embodiment of the invention is a laminate structure having three wood layers, 25, 26, 27, bonded together under heat and pressure, with the adhesive 21 being applied directly to the exposed wooden bottom surface 12 of the bottom layer 25 and covered with the release paper 23. According to one embodiment of the invention, the top layer 27 is a thin veneer layer of solid, unblemished, high quality wood, such as oak, while the middle and bottom layers 26 and 25 are either blemished strips of the same type of wood, or a less expensive type of wood. In embodiments wherein blemished wood is used on the bottom layer 25, the release paper 23 also provides a cosmetic covering over the blemishes until application of the flooring strip 10 to the subfloor.

Figure 5:
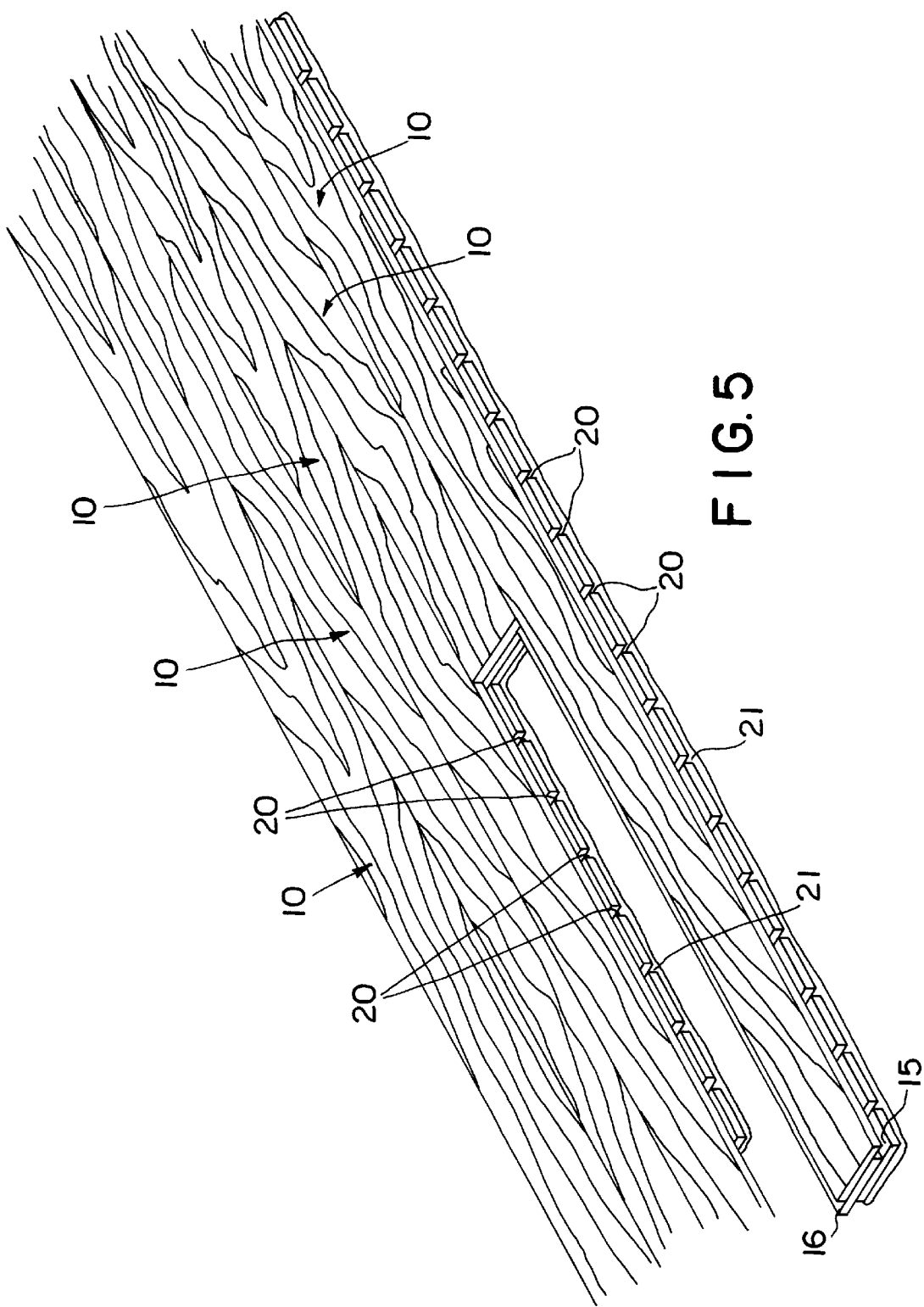
FIG. 5 is a perspective view of a section of laid flooring utilizing the flooring strips according to the present invention.
Figure 6:
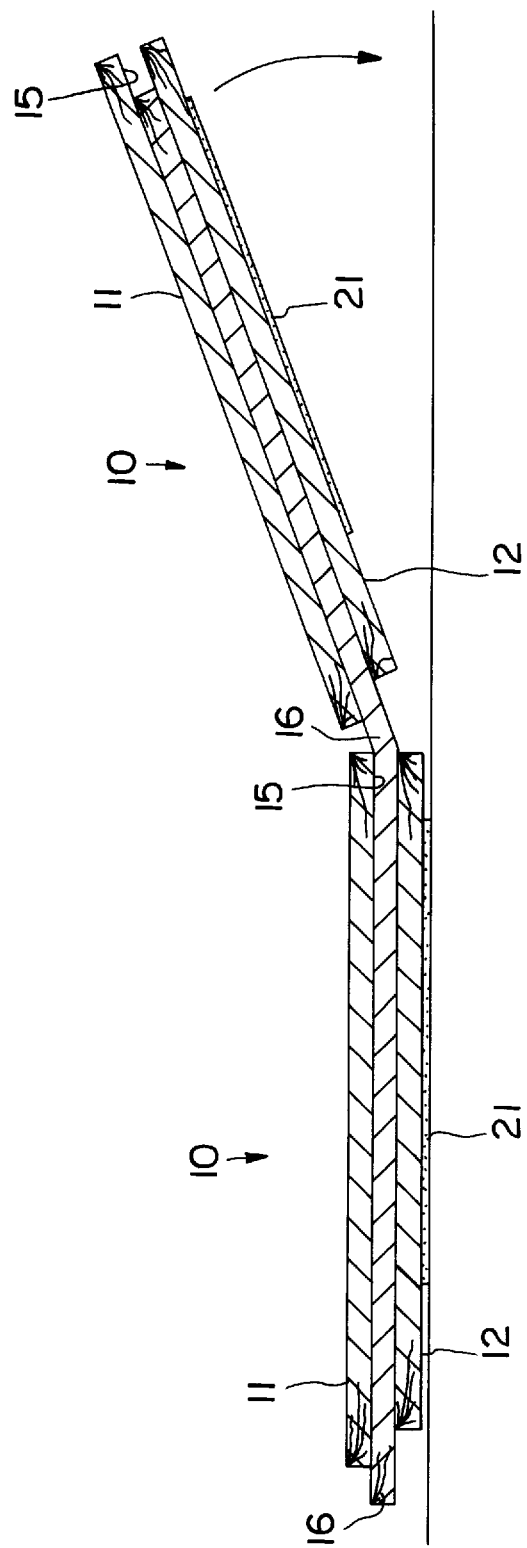
FIG. 6 is a side elevation illustrating a technique useful in installing flooring strips according to the present invention.

As is shown in FIGS. 5 and 6, installation of the flooring strip 10 as described more specifically below creates a finished hardwood floor indistinguishable from other floors which are more expensive and difficult to install.

DETAILED DESCRIPTION OF ADHESIVE

The preferred adhesive 21 is a hot melt, pressure sensitive adhesive manufactured by IFS Industries of Franklin Lakes, N.J., identified as "M-707".

The adhesive 21 may also be a hot melt, pressure sensitive adhesive manufactured by Capitol Adhesives. The Material Safety Data Sheet describes the product as thermoplastic material with a melting point of 208° F.

The adhesive 21 itself is a petroleum-based process oil with rubber and hydrocarbon resins. Its melt viscosity is 15,000 CPS Brookfield +/−1,000. The adhesive 21 is characterized by the fact that it remains tacky even at a high temperature.

The adhesive 21 is extremely robust, and even a short time after application, the adhesive 21 is sufficiently tenacious that trying to remove the flooring strip 10 by pulling up one end results in the flooring strip 10 splintering and breaking before the adhesive 21 releases.

As a preferred example, for a flooring strip 10 having a three inch wide top surface 11 and a 2⅞ inch wide bottom surface 12, the adhesive 21 is preferably applied with a ¼ inch margin between the one edge of the adhesive 21 and the side edge 14, and a ¼ inch margin between the opposite edge 21 and the opposing side edge 13.

The adhesive 21 is applied at a rate of approximately 0.06 lbs. sq/ft. The adhesive 21 has a nominal thickness when applied to the flooring strip 10 of approximately 1/32 inch. When applied to a ⅜ inch flooring strip 10, it is therefore applied at a rate which results in a thickness which is approximately 10% of the thickness of the flooring strip 10. This percentage will vary with thicker flooring strips, but should not exceed 10%. This percentage of added thickness is imperceptible after installation, since the adhesive 21 is dense, relatively noncompressible and thus eliminates springiness associated with prior art glue-down products. This substantially distinguishes the flooring strip 10 from the prior art flooring strips utilizing a foam adhesive backing where the backing may be as much as half the thickness of the wood itself.

The relative thinness of the adhesive in relation to the thickness of the flooring strip 10 provides stability to the flooring strip 10 and completely eliminates shearing of the adhesive. It is also important to emphasize that the adhesive is non-foamed. In other words, the adhesive is not mechanically agitated or chemically treated to create trapped air or other gases in the adhesive matrix. Rather, the adhesive 21 is a non-porous, non-foamed, extremely viscous material. If any air bubbles are present in the adhesive layer 21, they are incidental to and the result of handling.

SUMMARY OF PROCESS OF APPLYING ADHESIVE 21 AND RELEASE PAPER 23

Figure 7:
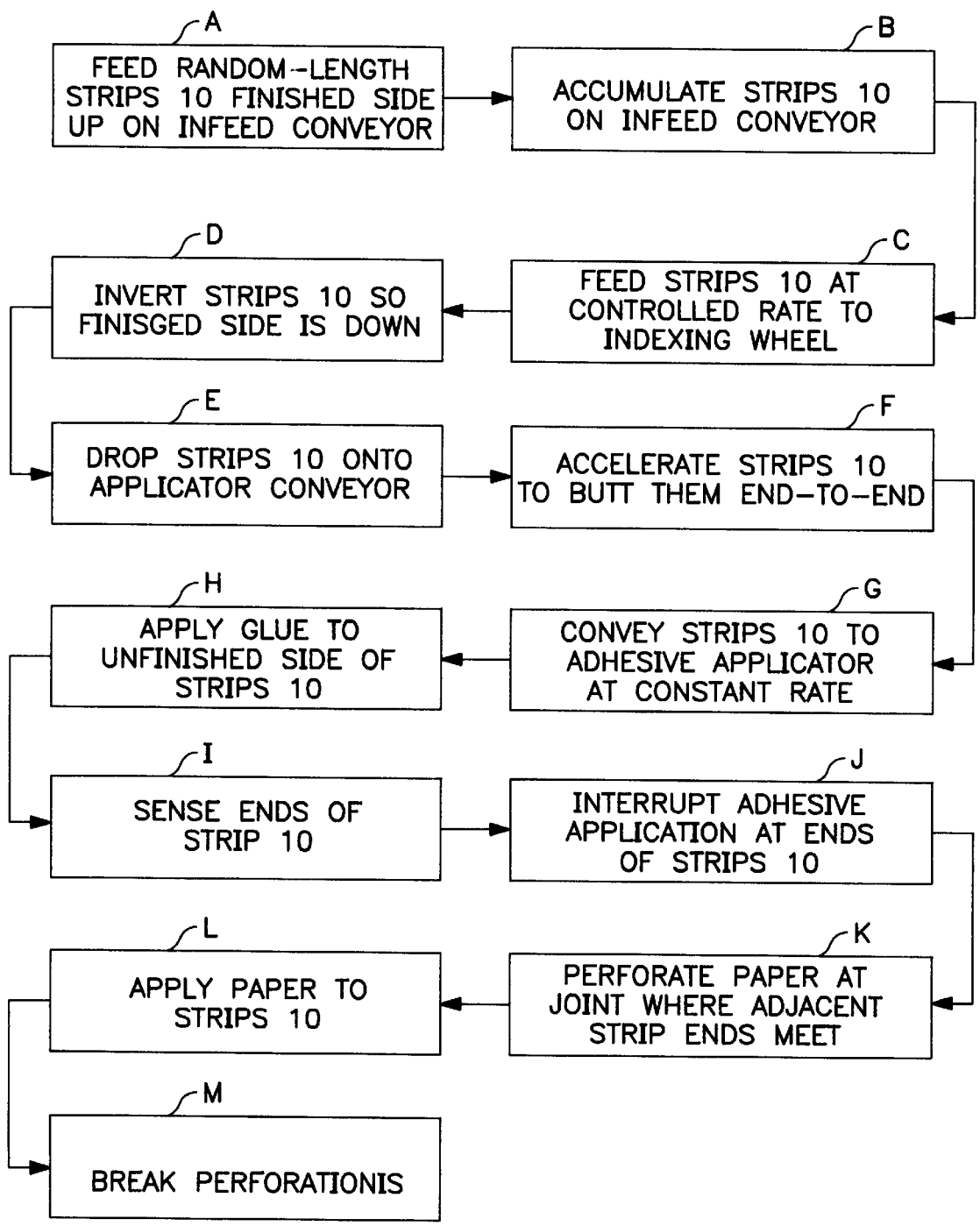
FIG. 7 is a flow diagram of the method according to an embodiment of the invention.

As is shown in FIG. 7, beginning with Step A, flooring strips 10 are received from upstream processing stations and are serially fed along an infeed conveyor finished, or decorative, side up. These strips 10 are of random lengths, as described above, and may be positioned at any orientation laterally across the width of the infeed conveyor.

The random-length strips 10 are accumulated at Step B on the infeed conveyor and fed to an indexing wheel (Step C) where the strips are inverted (Step D) so that the unfinished, bottom side is up, and fed at regular intervals onto a applicator conveyor at Step E.

The flooring strips 10 move along a first portion of the applicator conveyor at an accelerated speed so that the strips abut each other (Step F), and then move on a second portion of the applicator conveyor in abutting relation at a constant rate of travel (Step G) where hot melt adhesive 21 is applied. (Step H).

The ends of the flooring strips are sensed (Step I) and adhesive application halted in the region of the ends. (Step J).

Release paper is perforated in vertical alignment with the joint (Step K), and applied onto the adhesive 21 (Step L). Finally, the perforation is broken (Step M). The flooring strips are now ready for final inspection, boxing and shipment to installers or retainers for sale.

DETAILED DESCRIPTION OF APPARATUS

Figure 8:
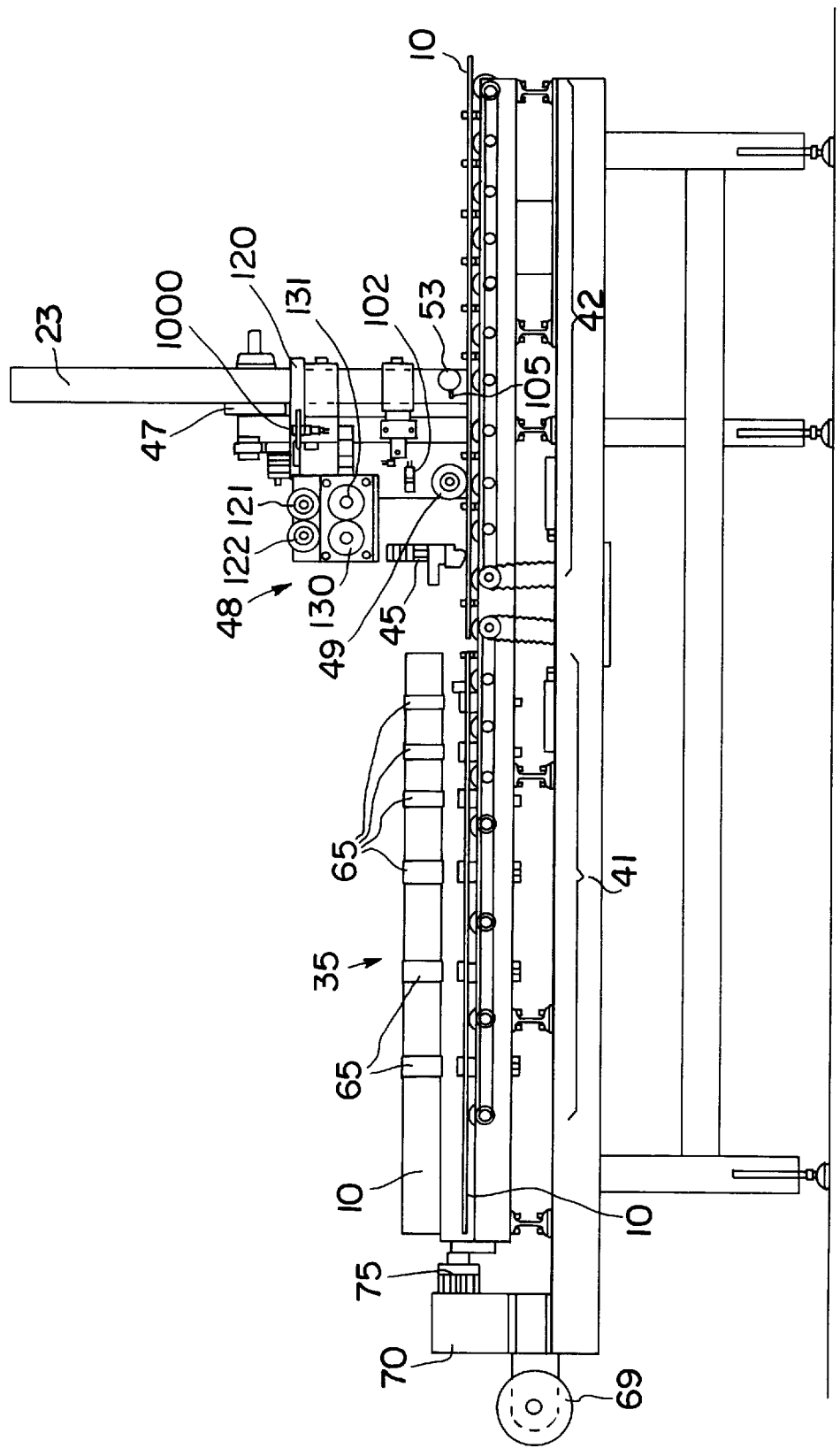
FIG. 8 is a front elevation of the apparatus for applying adhesive and release paper to wooden flooring strips.
Figure 9:
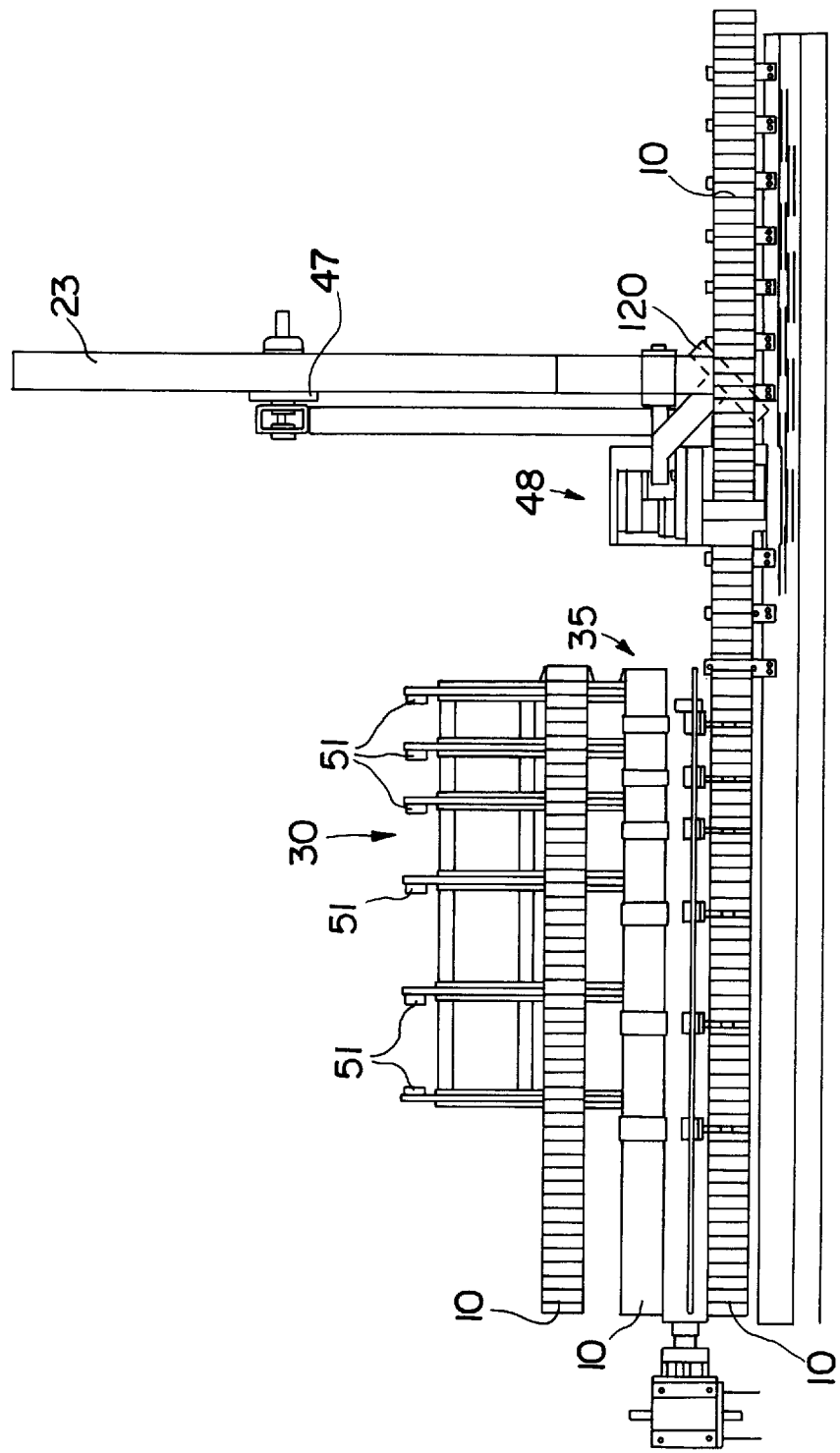
FIG. 9 is a top plan view of the apparatus for applying adhesive and release paper to wooden flooring strips.
Figure 10:
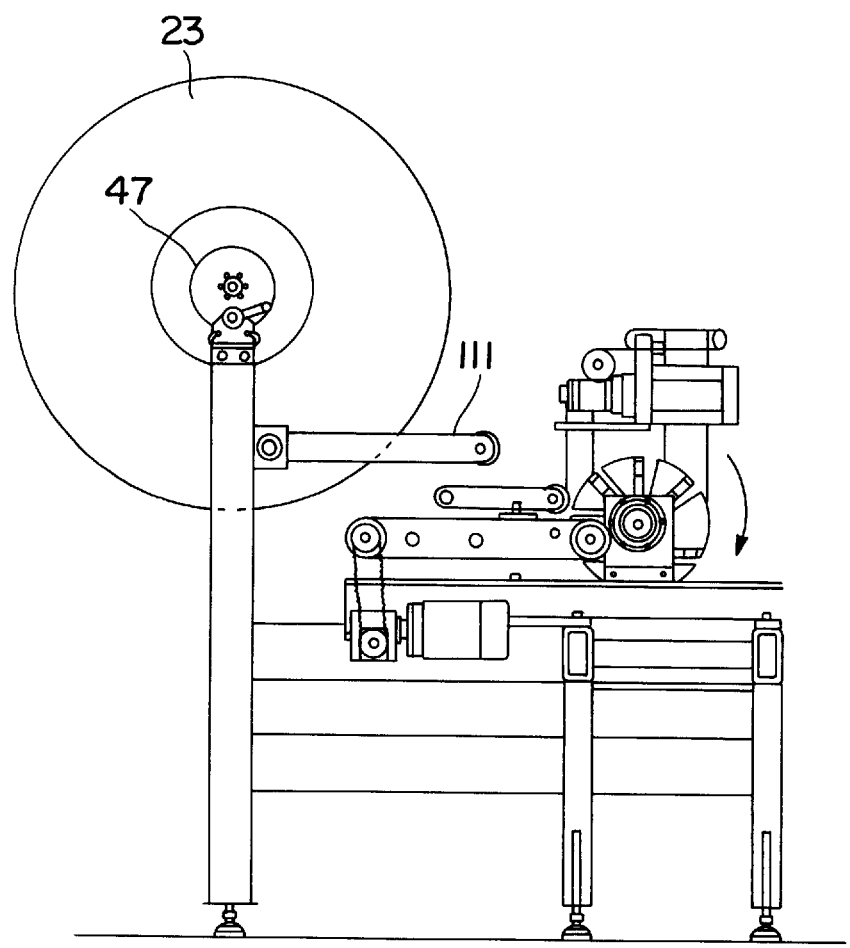
FIG. 10 is a side elevation of the apparatus for applying adhesive and release paper to wooden flooring strips.

Referring now to FIGS. 8, 9 and 10, an apparatus for applying hot melt adhesive 21 and a release paper 23 to the flooring strips 10 is shown. The apparatus and its functions are controlled by a computer, not shown. Flooring strips 10 in random lengths are fed finished side up from an upstream processing station onto an infeed conveyor 30. The shorter lengths of the flooring strips 10 are fed down the right-hand side of the infeed conveyor 30. The flooring strips 10 proceed along the infeed conveyor to an indexing wheel 35. The indexing wheel 35 resembles a paddle-wheel and sequentially takes a single flooring strip 10 finished side up and rotates it clockwise 180 degrees, dropping it finished side down onto an accelerator conveyor segment 80A of an applicator conveyor 80. The flooring strips 10 is accelerated forward until its leading end abuts the trailing end of the preceding flooring strip 10. The flooring strip 10 then moves toward an outfeed conveyor 80B where the adhesive 21 and release paper 23 are applied.

An adhesive applicator head 45 positioned directly above the downstream end of the applicator conveyor segment 80A applies hot-melt adhesive 21 to the upwardly-facing unfinished side of the flooring strip 10. Release paper 23 on a paper tape supply roll 47 is perforated by a paper perforator 48 as described below in more detail and applied under pressure from a pressure wheel 49 to the just-applied adhesive 21 on the flooring strip 10. The application of the paper 23 is timed so that the perforation is in alignment with the joint between two adjacent flooring strips 10. A paper break wheel 53 breaks the paper at the perforations and the flooring strips 10 is ready for final inspection and packaging.

Figure 11:
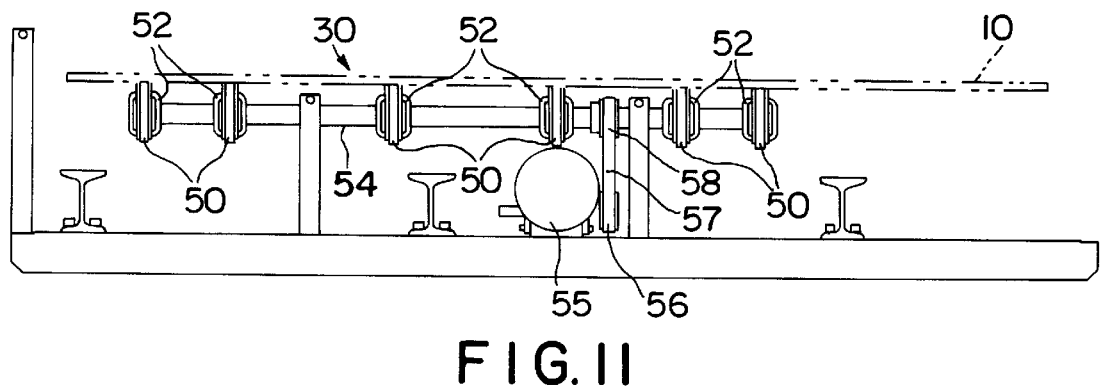
FIG. 11 is a front elevation of the infeed conveyor.
Figure 12:
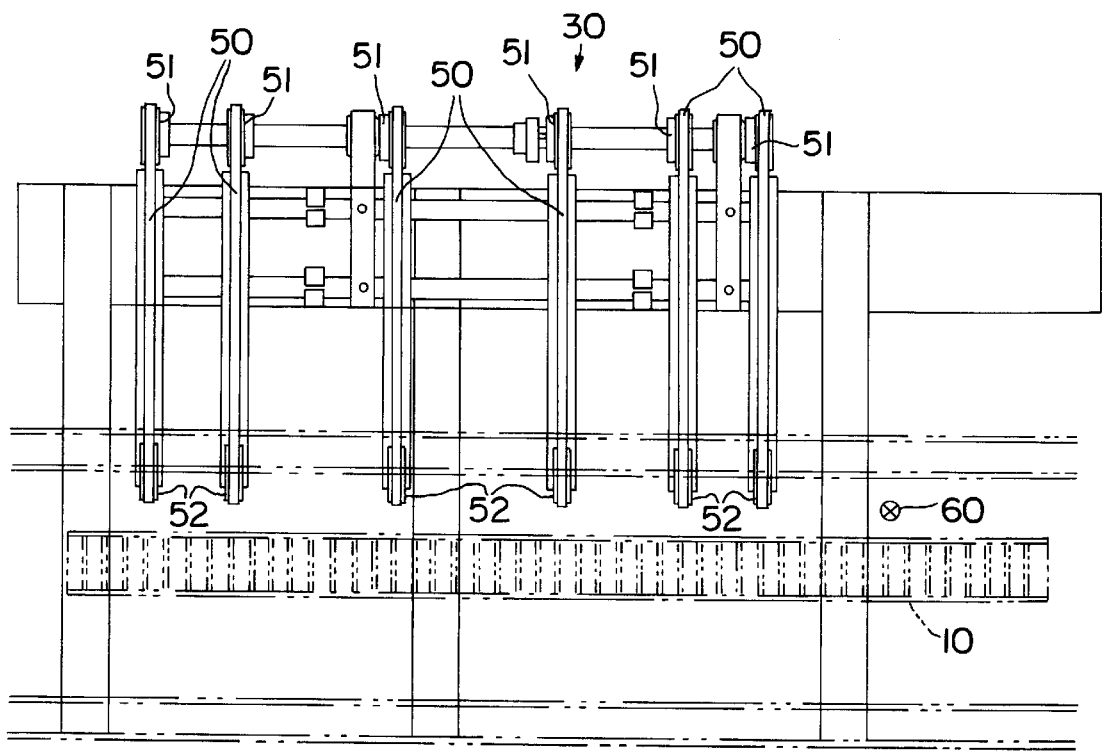
FIG. 12 is a top plan view of the infeed conveyor.
Figure 13:
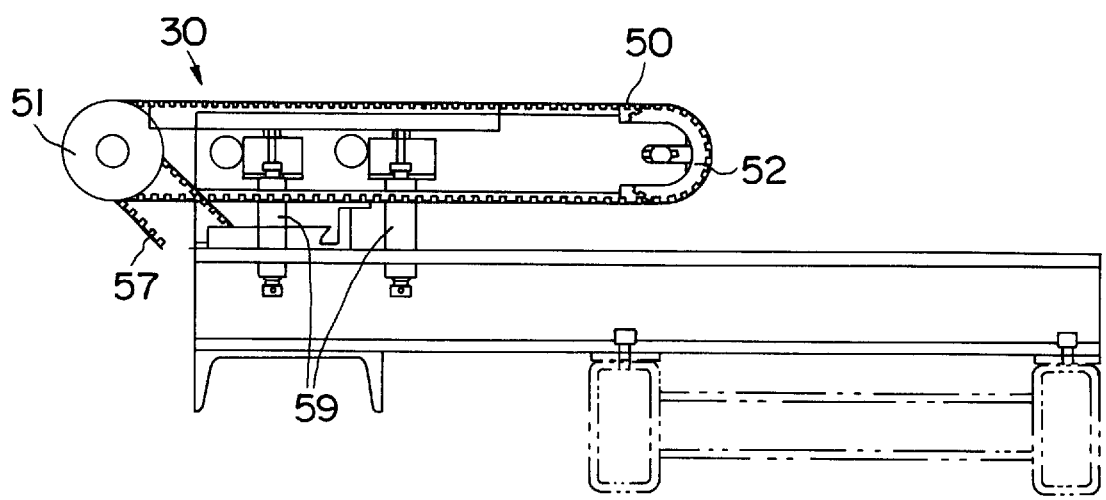
FIG. 13 is a side elevation of the infeed conveyor.

Referring now more specifically to FIGS. 11, 12 and 13, the infeed conveyor 30 is constructed of six laterally spaced-apart conveyor belts 50 mounted between conveyor rolls 51 and 52. Rolls 51 are mounted on and driven by a common drive shaft 54. The drive shaft 54 is driven by a conveyor drive motor 55 through a motor pulley 56 and a shaft pulley 58 connected by a conveyor drive belt 57.

A pair of air cylinders 59 operate a series of escapement fingers (not shown) which are pivotally-mounted between each of the conveyor belts 52 and extend along the length of the conveyor belts 52 in spaced-apart relation. The spacing of the escapement fingers corresponds with the desired spacing of the flooring strips 10 from each other. The air cylinders 59 and thus the escapement fingers are controlled by an optical sensor 60 which senses the presence of a flooring strips 10 in the loading position of the indexing wheel 35. The infeed conveyor 30 runs continuously, and the escapement fingers move upwardly between the conveyor belts 50 to restrain movement of the flooring strips 10 as necessary to feed the indexing wheel 35 at the proper rate. The optical sensor 60 signals the indexing wheel 35 to rotate and receive another flooring strip 10 from the infeed conveyor 30.

As the belts 50 rotate they carry forward random lengths of flooring strips 10 delivered from an upstream processing station. The lateral spacing of the belts 50 from each other is chosen to insure that even relatively short lengths of flooring strips 10 are engaged at two spaced-apart points on their surface. This prevents turning of a flooring strips 10 into a diagonal position as would happen if only one belt were to engage the flooring strips 10 at any point except in the exact center.

Referring now to FIGS. 14, 15 and 16, the indexing wheel 35 sits at the downstream end of the infeed conveyor 30, and includes six spaced-part paddle assemblies 65. Each of the paddle assemblies 65 has eight paddles 65A–H which are radially-spaced equidistantly around an indexing wheel shaft 67. The spacing of the paddle assemblies 65 from each other along the length of the indexing wheel shaft 67 is such that both very short and longer flooring strips 10 are received and supported in at least two places along their length.

The indexing wheel shaft 67 is driven by a drive motor 69 through a gear box 70 which includes a single revolution clutch 73 and a shaft indexer 74 for indexing the indexing wheel shaft 67 to receive a flooring strip 10. An overload coupler 75 protects the motor 69 and gear box 70 in the event of a jam, such as a flooring strip 10 becoming caught in the indexing wheel 35.

As flooring strips 10 are fed along the infeed conveyor 30, successive flooring strips 10 are received into a position between adjacent ones of paddles 65A–G which are in position in alignment with the plane of the infeed conveyor 30. An optical sensor 72 senses that there is a flooring strip 10 in position on one of the paddles 65A–G and signals the shaft indexer 74 to increment the indexing wheel 35 one-eighth revolution. As successive flooring strips 10 are fed into the indexing wheel 35, a flooring strips 10 moves across the top of the indexing wheel 35 and down the side of the indexing wheel 35 remote from the infeed conveyor. Thus, the optical sensor 72 indicates that the infeed conveyor 30 under the indexing wheel 35 is empty and that the indexing wheel 35 can rotate to invert another flooring strip 10.

Referring now to FIGS. 17–19, the flooring strips 10 are ejected from the indexing wheel 35 onto the applicator conveyor 80, which, as noted above, is divided into two segments—an accelerator conveyor segment 80A and an outfeed conveyor segment 80B. The accelerator conveyor segment 80A is comprised of a spaced-apart series of rollers 81 provided with a textured elastomeric surface covering which provides a secure grip on the flooring strips 10 and tracks them precisely downstream. As the indexing wheel 35 rotates to deliver a flooring strip 10 to the accelerator conveyor segment 80A, a cam (not shown) switches the accelerator conveyor segment motor 83 to a high-speed mode to accelerate the flooring strip 10 forward into abutment with the adjacent preceding flooring strip 10.

When abutment occurs between two adjacent flooring strips 10, the accelerator conveyor segment 80A resumes a slower speed which is the same as the speed of the outfeed conveyor segment 80B. The adjacent flooring strips 10 proceed in tandem along outfeed conveyor rollers 85 as adhesive 21 is applied. The outfeed conveyor segment 80B is driven by a constant speed motor 87.

As the flooring strips 10 proceed along the conveyor segments 80A and 80B they are held in position by hold-down roller assemblies 90, 91 and 92. Hot melt adhesive 21 is applied by the adhesive applicator head 45.

An optical sensor 94 projects a see-through beam which senses the trailing gap between two flooring strips 10 and stops the flow of adhesive 21 for a distance of about one-half inch from the end edges of the adjacent flooring strips 10, as is shown in FIG. 4.

An adjacent optical sensor 95 detects the absence of a flooring strip 10 when and if one occurs, and stops the flow of adhesive 21, thus preventing the inadvertent application of adhesive 21 to the outfeed conveyor rollers 85.

Since the outfeed conveyor segment 80B moves at a constant rate, presence of the joint between adjacent flooring strips 10 when sensed at optical sensor 94 indicates by calculation in the computer that at a given later time the joint will be at a predetermined downstream position on the outfeed conveyor segment 80B. With this information the paper perforator 48 can be signalled to perforate the paper 23 so that the perforation line in the paper 23 matches the position of the joint between adjacent flooring strips 10 when applied.

Paper 23 is dispensed from the paper roll 47 and passes to the paper perforator 48. An optical sensor 100 detects any breaks in the paper 23 upstream of the perforator 48. The paper 23 is perforated, as described in further detail below, and is pressed by the pressure roller 92 onto the just-applied hot melt adhesive 21. The perforation line formed in the paper 23 overlies and is in registration with the joint between adjacent flooring strips 10.

An optical sensor 102 downstream of the paper perforator 48 senses a condition whereby if the paper 23 breaks along the perforation line in advance of application to the flooring strip 10, the machine is stopped.

The paper break wheel 53 is timed by sensor 94, so that as the joint between two adjacent flooring strips 10 reaches the break wheel 53, the break wheel 53 rotates counterclockwise. The rotation causes a radially-extending blade 105 to pivot downwardly onto and through the perforation line, breaking the perforation and separating the flooring strips 10.

Figure 20:
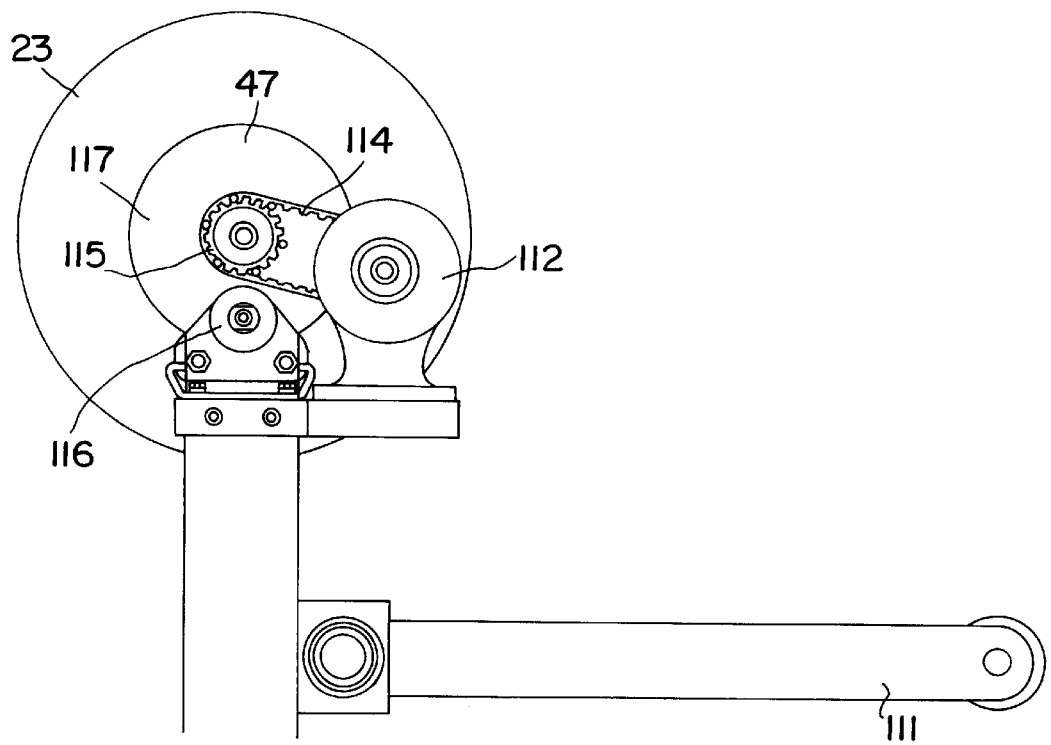
FIG. 20 is a side elevation of the tension control mechanism for the paper supply roll.
Figure 21:
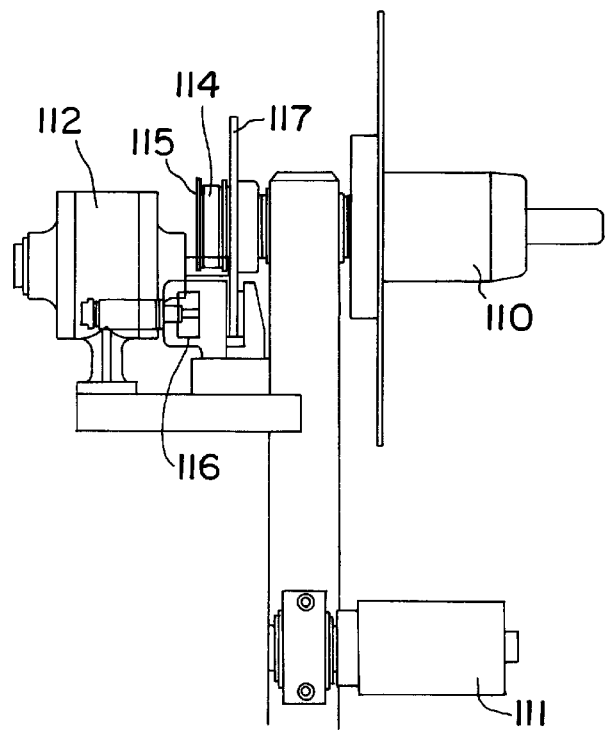
FIG. 21 is an end elevation of the tension control mechanism shown in FIG. 20.

Referring now to FIGS. 20 and 21, the tension control mechanism of the paper supply roll 47 is described. As noted above, the flooring strips 10 are random length, and the perforations in the paper 23 must be made in registration with the joint between adjacent flooring strips so that the paper break wheel 53 can break the perforation to properly separate the flooring strips 10 from each other.

The paper 23 is stored in the form of the paper supply roll 47 on a core chuck 110. The paper 23 is dispensed from supply roll 47 and passes over a spring-loaded tension control arm 111 before being received in the paper perforator 48. The supply roll 47 is rotated by an air motor 112 which rotates a timing belt 114 driving a sprocket gear 115. Motor 112 is controlled by sensor 95, which signals motor 112 to stop rotation of the supply roll 47 along with application of the adhesive 21 in the event that no flooring strip 10 is sensed as being present on the applicator conveyor segment 80A.

A solenoid 116 stops rotation of the paper supply roll 47 when flooring strips 10 are not being fed through the apparatus by applying force against a brake disk 117 concentrically-mounted on the core chuck 110.

Figure 22:
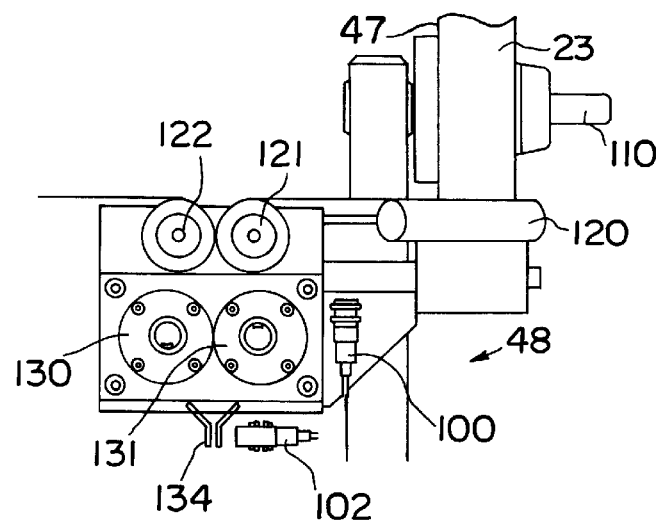
FIG. 22 is a side elevation of the feed mechanism for the paper supply roll.
Figure 23:
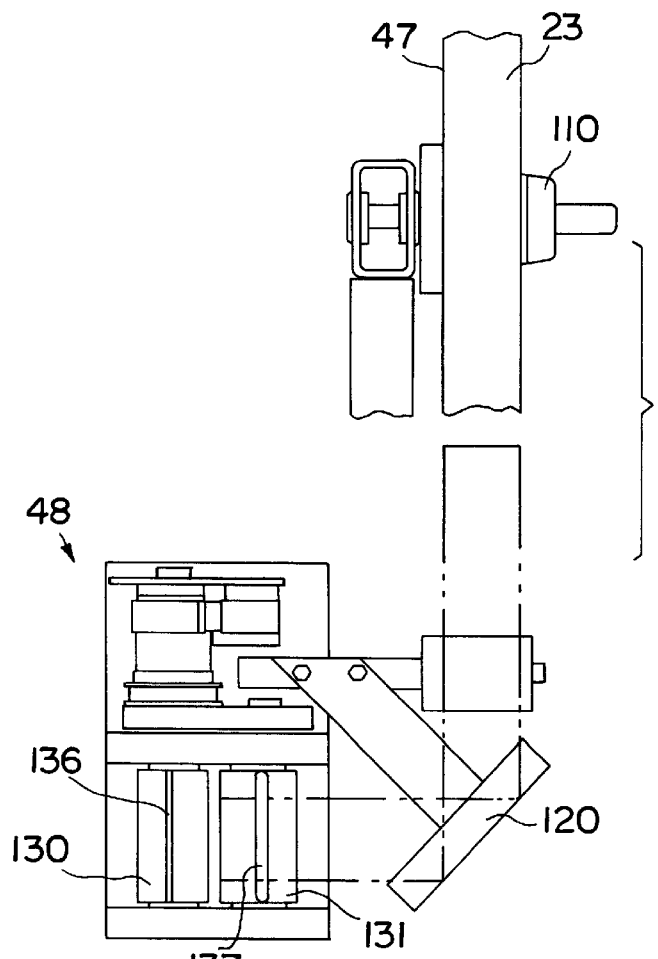
FIG. 23 is a fragmentary top plan view of the feed mechanism shown in FIG. 22.

Referring now to FIGS. 22 and 23, paper 23 passes over a turn bar 120 which turns the paper 23 90 degrees. The paper 23 is then passed between feed rollers 121, 122. The paper 23 then passes between a knife roller 130 and an anvil roller 131 where a knife 136 perforates but does not completely sever the paper 23. The perforated paper 23 passes between a guide 134 and is then applied to the freshly laid coating of hot melt adhesive 21. See FIG. 18.

Figure 24:
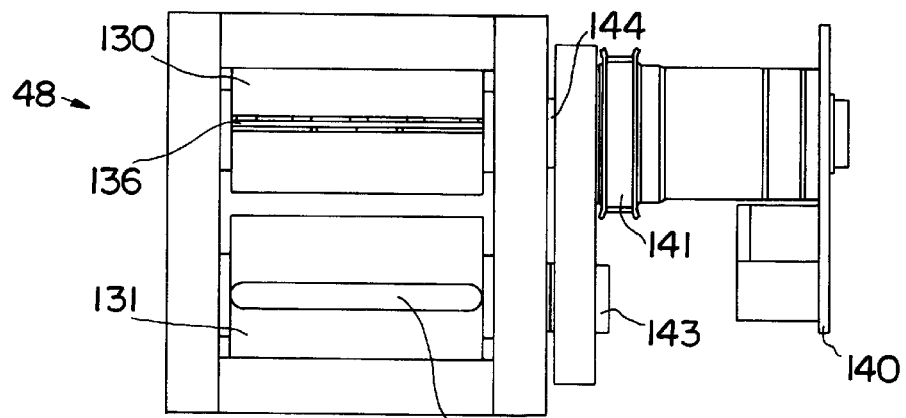
FIG. 24 is a side elevation of the paper cutting mechanism.
Figure 25:
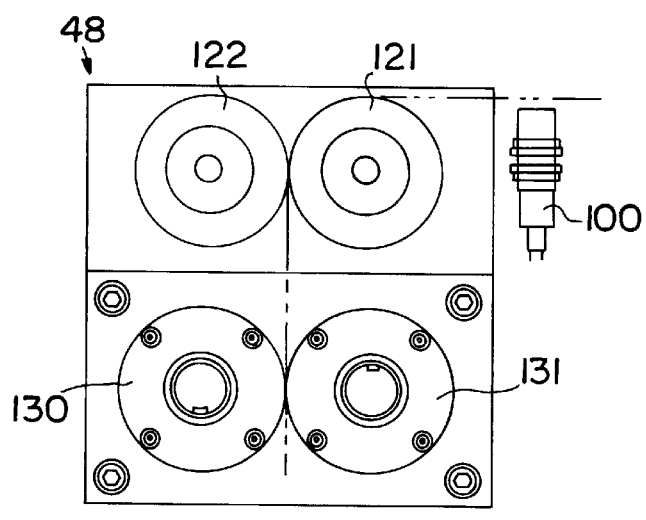
FIG. 25 is a front elevation of the paper cutting mechanism shown in FIG. 24.
Figure 26:
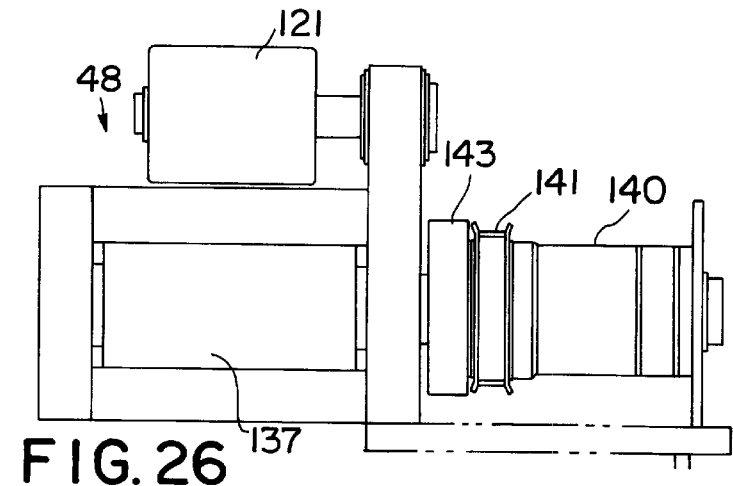
FIG. 26 is a front elevation of the paper cutting mechanism shown in FIG. 25.

Referring now specifically to FIGS. 24, 25 and 26, the knife roller 130 and anvil roller 131 are aligned in a horizontal plane so that the perforation knife 136 rotates against a cutting block 137 on the anvil roller 131, perforating the paper 23. The knife roller 130 and the anvil roller 131 are each rotated by a single revolution clutch 140 through a drive input 141 and a pair of mating drive gears 143, 144. During a single revolution of the knife roller 130 and the anvil roller 131, the knife 136 and the cutting block 137 mate once, permitting the paper 23 to be perforated. As is best seen in FIG. 24, the space between the knife roller 130 and the anvil roller 131 is sufficient so that when the knife 136 and cutting block 137 are not in registration there is space for the paper 23 to pass between them without being perforated. The knife 136 and cutting block 137 are raised above the surface of the knife roller 130 and anvil roller 131, respectively, so when they mate the paper 23 is trapped between them in a position to be perforated. The knife roller 130 and anvil roller 131 do not rotate except in immediate advance of a perforation motion.

As noted above, the outfeed conveyor segment 80B moves at a constant rate. Paper 23 is normally fed constantly and at a constant rate. The presence of the joint between adjacent flooring strips 10 is sensed by optical sensor 94 and a rate of travel/time calculation by the computer indicates that at a given later time the joint will be at a predetermined downstream position on the outfeed conveyor segment 80B. With this information the knife roller 130 and the anvil roller 131 are timed to rotate so that the perforation line in the paper "P" matches the position of and is overlaid on the joint between adjacent flooring strips 10.

APPLICATION TO FLOORING STRIPS 10 TO SUBFLOOR

The flooring strip 10 described above may be applied to a number of different subfloor constructions, such as plywood, oriented strand board or 40 pound particle board. The floor can also be installed over existing floors. If the existing floor is a wood floor, all wax must be removed, since the adhesive is designed not to stick to waxed surfaces—hence the use of a wax-coated release paper. Polyurethane-finished floors need not be stripped as long as the finish is well bonded. Vinyl-type flooring can be used so long as the wear layer is intact and has a PVC or Polyurethane wear layer. The floor can be installed over a concrete subfloor if clean and dust-free. This condition can be achieved by carefully sweeping or vacuuming the floor, and then cleaning it with solvent or alcohol cleaner. Preferably, installation should take place at a temperature of 60° F. or above.

Plaster dust and similar materials prevent the adhesive from adhering to the subfloor, so cleaning to remove these and similar materials is very important.

INSTALLATION METHOD

A chalk line, framing square, a roller, such as a hardwood flooring roller, 80–150 pound vinyl roller, small hand-held roller or rolling pin, and a miter saw are usually the only tools needed for installation.

A 5% cutting allowance is usually sufficient. The subfloor should be checked for damage, levelness and cleanliness, and corrected if necessary.

First, the installer finds starting point depending on pattern and chalk line in a conventional manner. A "dry" fit of the flooring strip 10 is made to determine necessary cuts. The ends are measured before removing the release paper 23, the ends are dry fitted, then cut, then the release paper 23 is removed to expose the adhesive and the flooring strip 10 is carefully pressed onto the subfloor. The flooring strip 10 is applied to the subfloor along a chalk line, with the groove 15 on the chalk line, and the tongue 16 away from the installer. Other cuts around heat registers, pipes and the like are made as the flooring strips 10 are installed, and before removal of the release paper 23, as described above.

Referring to FIG. 6, the manner of installation of individual flooring strips 10 is shown. As noted above, marginal areas of the bottom surface of the flooring strips 10 are not covered with adhesive 21. Flooring strips 10 are installed with the tongue 16 facing away from the installer. Release paper 23 is removed and the tongue 16 of the flooring strip 10 is introduced into the groove 15 of the adjacent flooring strip 10 at an angle, as shown in FIG. 6. The absence of adhesive 21 on the marginal area of the bottom surface 12 adjacent the tongue 16 permits placement of the flooring strip 10 very closely adjacent to the just-laid flooring strip 10 without the adhesive 21 contacting the subfloor. The tongue 16 can therefore be inserted completely into the adjacent groove 15 and the flooring strip 10 pressed firmly onto the subfloor in a single motion. The adhesive 21 is sufficiently tenacious that the flooring strip should be very substantially in its final position before being pressed to the subfloor. If needed, the flooring strip 10 can be tapped, taking care not to damage the top surface edges, in order to position it seamlessly next to its adjacent flooring strip 10.

Shoe molding, radiator pipe flanges and heat register covers are reinstalled. The entire floor is rolled after installation of the flooring strips 10, and the installation is complete.

An apparatus and method for applying adhesive and release paper to hardwood flooring strips, a laminated wood flooring product, and a wood floor assembled from strips of the laminated wood flooring product is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. An apparatus for applying adhesive and a protective release paper to successive elongate wooden flooring strips having a top decorative side, and a bottom adhesive side for being adhered to a supporting subfloor, comprising:

(a) infeed conveyor means for receiving successive wooden flooring strips top side-up from an upstream processing station in parallel lengthwise alignment to each other and moving the flooring strips in a direction of movement perpendicular to the length of the flooring strips;

(b) accumulating means for equally spacing the flooring strips apart on the infeed conveyor;

(c) inverting means for receiving successive flooring strips from said infeed conveyor and successively inverting the flooring strips from top decorative side-up to bottom adhesive side-up;

(d) applicator conveyor means for receiving the inverted flooring strips from the inverting means and moving the flooring strips end-to-end in a direction of movement parallel to the length of the flooring strips;

(e) adhesive application means positioned above the applicator conveyor means for applying adhesive to the bottom adhesive side of the flooring strips as they move beneath the adhesive application means; and (f) release paper means positioned above and downstream from said adhesive application means for applying a release paper to the adhesive on the flooring strip.

2. An apparatus according to claim 1, wherein said accumulating means comprises:

(a) infeed conveyor sensing means for sensing the presence of a flooring strip on the infeed conveyor at a position closer than a predetermined minimum distance to a preceding adjacent flooring strip; and (b) holding means responsive to said infeed conveyor sensing means for holding the flooring strip against movement on the infeed conveyor for an interval determined by the rate at which the inverting means receives the next successive flooring strip, and for releasing the flooring strip for movement to said inverting means when said sensing means indicates that the predetermined minimum distance between adjacent flooring strips exists.

3. An apparatus according to claim 1 or 2, wherein said inverting means comprises an indexing wheel mounted for rotation between said infeed conveyor means and said applicator conveyor means, said inverting wheel comprising:

(a) an axle mounted for indexed rotation about an axis perpendicular to the direction of movement of the infeed conveyor and parallel to the direction of movement of the applicator conveyor;

(b) drive means connected to said axle for indexing said inverting wheel through predetermined successive arcs; and (c) a plurality of spaced-apart diverging blades carried by and extending radially outwardly from the axle, each of said blades having a flooring strip receiving surface for receiving successive flooring strips from the infeed conveyor means and inverting the flooring strip for placement of the inverted flooring strip onto the applicator conveyor.

4. An apparatus according to claim 1, wherein said applicator conveyor includes:

(a) an upstream accelerator conveyor segment onto which the inverted flooring strips are received from said inverting means, said accelerator conveyor segment accelerating the wood flooring strip thereon downstream into end-to-end abutting contact with a preceding flooring strip; and (b) a downstream outfeed conveyor for delivering processed flooring strips from the apparatus.

5. An apparatus according to claim 4, wherein said accelerator conveyor segment is driven by a two speed motor having a high speed for accelerating the flooring strip into end-to-end abutting contact with a preceding flooring strip during operation of said inverting means, and a low speed for moving the flooring strip at the same speed as the outfeed conveyor.

6. An apparatus according to claim 4 or 5, and including applicator sensing means for stopping and starting application of adhesive and release paper to the flooring strips.

7. An apparatus according to claim 6, wherein said release paper means includes:

(a) a paper roll for delivering a continuous length of release paper;

(b) flooring strip end sensing means for detecting a forward end of the flooring strips; and (c) perforation means for perforating the release paper before application of the release paper to the flooring strips such that the perforation is in alignment with the joint between adjacent flooring strips after application of the release paper to the flooring strips.

8. An apparatus according to claim 7, and including perforation breaking means for breaking the perforation.

9. A method for applying adhesive and a protective release paper to successive elongate wooden flooring strips having a top decorative side, and a bottom adhesive side for being adhered to a supporting subfloor, comprising:

(a) receiving successive wooden flooring strips top side-up from an upstream processing station in parallel lengthwise alignment to each other;

(b) moving the flooring strips on an infeed conveyor in a direction of movement perpendicular to the length of the flooring strips;

(c) spacing the flooring strips apart on the infeed conveyor;

(d) inverting the flooring strips from top decorative side-up to bottom adhesive side-up;

(e) receiving the inverted flooring strips and moving the flooring strips end-to-end in a direction of movement parallel to the length of the flooring strips;

(f) applying adhesive to the bottom adhesive side of the flooring strips as they move beneath an adhesive application means; and (g) applying release paper to the adhesive on the flooring strip.

10. A method according to claim 9, wherein the step of spacing the flooring strips comprises:

(a) sensing the presence of a flooring strip on the infeed conveyor at a position closer than a predetermined minimum distance to a preceding adjacent flooring strip; and (b) holding the flooring strip against movement on the infeed conveyor for an interval determined by the rate at which the inverting means receives the next successive flooring strip, and for releasing the flooring strip for movement to said inverting means when said sensing means indicates that the predetermined minimum distance between adjacent flooring strips exists.

11. A method according to claim 9 or 10, wherein the step of said inverting the flooring strips comprises:

(a) delivering the flooring strips consecutively onto an indexing wheel mounted for rotation between said infeed conveyor means and said applicator conveyor means; and (b) rotating the indexing wheel about an axis perpendicular to the direction of movement of the infeed conveyor and parallel to the direction of movement of the applicator conveyor to position the bottom adhesive side in an upwardly-facing position.

12. A method according to claim 9, wherein the step of moving the flooring strips end-to-end comprises the step of accelerating a wood flooring strip downstream into end-to-end abutting contact with a preceding flooring strip.

13. A method according to claim 12, wherein the step of applying adhesive to the bottom adhesive side of the flooring strips includes the step sensing of the ends of the flooring strips and interrupting application of adhesive in an area adjacent the ends of the flooring strip.

14. A method according to claim 13, wherein the step of applying release paper to the adhesive comprises the steps of:

(a) delivering a continuous length of release paper to a flooring strip onto which has just been applied the adhesive;

(b) sensing a forward end of the flooring strip; and (c) perforating the release paper before application of the release paper to the flooring strips such that the perforation is in alignment with the joint between adjacent flooring strips after application of the release paper to the flooring strips.

15. An apparatus according to claim 14, and including the step of breaking the perforation.

\* \* \* \* \*